June 19, 1951            S. S. BARKER            2,557,335
METHOD OF REMOVING FEATHERS FROM POULTRY
Filed Jan. 21, 1948
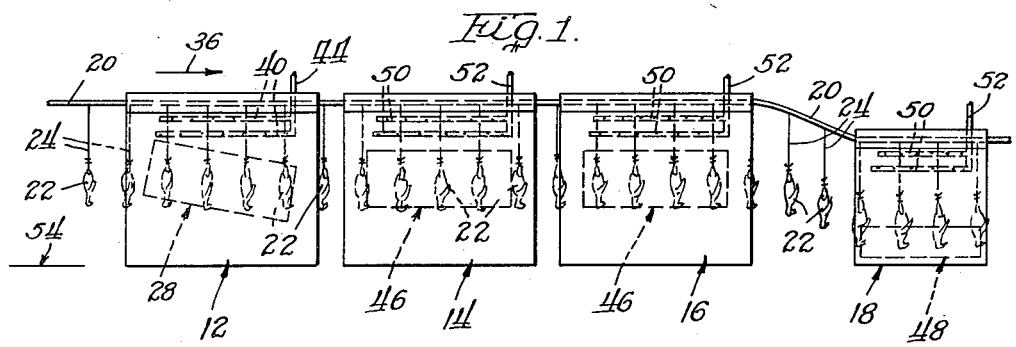
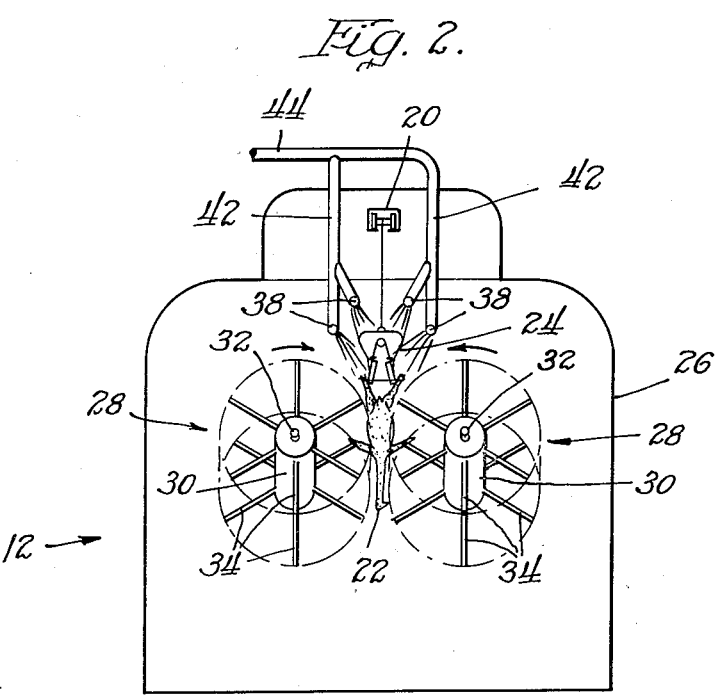
Inventor:
Seth S. Barker:
By Bair & Freeman
Attys Patented June 19, 1951

2,557,335

UNITED STATES PATENT OFFICE 2,557,335

METHOD OF REMOVING FEATHERS FROM POULTRY

Seth S. Barker, Ottumwa, Iowa

Application January 21, 1948, Serial No. 3,417

5 Claims. (Cl. 17—45)

This invention relates to a method of removing feathers from poultry, sometimes referred to in the art, and herein as "plucking" or "picking."

An object of the present invention is the provision of a novel method of picking poultry in which cold water is employed for wetting the poultry as a step in the picking process.

Another object of the invention is the provision of a novel method of picking poultry in which scalding, as it has been heretofore known, is eliminated as a step in the picking process.

A further object is the provision of a novel method of picking poultry, in which water of a temperature range, below the normal body temperature of the poultry, is employed for wetting the poultry as a step in the picking process.

Still another object is the provision of a novel method of picking poultry in which the poultry are chilled below their normal body temperatures in the picking process, whereby the subsequent refrigerating or freezing process is expedited, due to the reduced differential between the body temperature of the poultry and the refrigerating or freezing temperature.

Another object of the invention is the provision of a method of picking poultry, in which is included the novel step of wetting the poultry with unheated tap or hydrant water of temperatures of a range down to a point only slightly above freezing.

Still another object of the invention is the provision of a novel method of picking poultry in which great economy is effected, due to elimination of the necessity for heating water for scalding the poultry which has heretofore been considered necessary.

And, a still further object is the provision of a novel method of picking poultry employing the step of simultaneously, agitating and wetting the feathers of the poultry, while the same is suspended in air.

Another object is the provision of a novel and sanitary method of picking poultry, comprising the continuous use of a fresh supply of water.

A still further object is the provision of a novel method of machine picking of poultry in which injury to the skin of the poultry is substantially eliminated.

With these and other objects in view, my invention consists in the method hereinafter more fully set forth, and pointed out in my claims, the accompanying drawings being illustrative of one means for carrying my invention into effect; in the drawings:

Figure 1 is a diagrammatic illustration of a preferred type of apparatus for carrying out the novel method embodying my invention; and Figure 2 is a semi-diagrammatic view from the left of Figure 1.

In order to appreciate to the fullest extent the advance in the art manifested in the method of my invention, attention is directed to the methods heretofore and currently in use, together with certain difficulties and obstacles encountered in connection therewith, and which the present invention overcomes.

Dry picking of feathers from poultry is an inefficient and time consuming method, as is generally known, and an obvious step to advance the art was to scald the poultry and then pick it. Scalding in one form or another has been employed for a number of years in commercial processes of poultry picking, and the generally known first step in this direction was "hard scalding." This method comprised subjecting the poultry for a certain period of time to hot water of temperatures in the range of approximately 140° F. to 180° F. This, of course, enabled the feathers to be picked more easily, because the skin of the poultry was softened and the feathers were not held so tightly as when dry.

However, hard scalding resulted in certain damage to the skin of the poultry, in addition to the fact that it was costly to heat water to the desired temperatures in quantities required for large production on a commercial scale.

Hard scalding was later replaced by "slack scalding" which included the use of water of temperature ranges of about 118° F. to 132° F., which is the practice now generally employed commercially. In the case of slack scalding, the poultry is subjected to the water for a longer period of time than in the case of hard scalding. Slack scalding is an improvement over hard scalding, both because of less likelihood of damage or injury to the skin of the fowl, and because it was obviously less costly to heat the water to the lower temperature required, than in the case of hard scalding, and poultry will more readily keep in storage.

Slack scalding was accepted generally by the trade, who recognized its advantages over hard scalding. They also recognized certain peculiarities connected with slack scalding; it is known that the most effective temperatures of the water are very critical, i. e.; a difference of only a few degrees in temperature produces widely variant results. For example, a drop in temperature of the scalding water of two degrees below the recognized lower limit, brought about quite a noticeable change in results, and a drop of four degrees brought about such a change that steps were immediately taken to bring the temperature of the water up. The disadvantages caused by such limitations are obvious.

Moreover, the limits of the period of time in which the poultry is subjected to the scalding water for best results are also critical. Such a short time as only a few seconds longer or less than that period of time required, brought about undesirable results.

Because of these disadvantages, the trade has long been seeking a new method which would allow more latitude with respect to operating limits, and, of course, to reduce costs attendant upon the use of old methods.

The method of my present invention has overcome all of the above noted objections and disadvantages, and resulted in numerous advantages, which will become more readily apparent from following detailed description of one manner of carrying my method into effect.

The apparatus illustrated in Figure 1 shows various pieces of poultry treating equipment utilized for employing my invention. The illustrations in the drawing are purposely simple, and without needless detail, to emphasize the steps of the method of my invention. The reference numeral 12 designates a wetting machine, and 14, 16, and 18, are picking machines of various types and for various purposes. A conveyor 20 is used in cooperation with the various pieces of apparatus. This conveyor may be of any desired type such as a rectangular channel shape as illustrated in Figure 2, in which a conveyor chain travels. The conveyor 20 may be employed for carrying the poultry to various places and only that portion directly connected with the poultry treating apparatus is illustrated herein. A number of fowl 22 are suspended from shackles 24 head end down, which, in turn, are carried by the conveyor and chain and suspended therefrom. The fowl are spaced along the conveyor at convenient intervals or at the intervals determined by the speed of the operators of the apparatus.

The wetting machine 12, which is sometimes referred to as a tunnel, includes an enclosing shell 26 having an opening at each end through which the fowl travel. Rotatably mounted in the wetting machine 12 are a pair of agitator drums 28. Each drum 28 comprises a central cylindrical member 30 having supporting members 32 at its ends. A plurality of feather agitating fingers 34 are secured to each of the cylindrical members 30 and extend radially therefrom. These fingers 34 are arranged radially in a plurality of rows circumferentially around the cylinder 30, and axially spaced apart therealong. The present illustration shows six such rows, but of course other numbers of rows may be employed. These fingers 34 are preferably made of rubber or other flexible material, preferably having corrugated or irregular surfaces, and are of considerable length, as illustrated in Figure 2. These fingers also are usually flexible enough so that when the drums 28 are stationary, they do not extend radially outwardly, but droop or hang. When the drums are rotated at a certain rate of speed, the fingers fly out under influence of centrifugal force and assume radial positions.

The drums 28 are arranged parallel longitudinally of the machine, as illustrated in Figure 2, and may be spaced with relation to each other so that the fingers on the two drums overlap or intermesh to some extent, or they may be spaced apart so that the ends of the respective fingers do not extend quite to the center line of the machine, as shown in Figure 2. The drums 28 are inclined at an angle with respect to the horizontal as illustrated in Figure 1, the higher ends being disposed at the entrance to the machine. In Figure 1 the entrance to the wetting machine 12 is at the left and, therefore, the direction of travel of the conveyor and the fowl is from left to right, as indicated by the arrow 36.

The agitator drums 28 may be supported in the wetting machine 12 and driven in any convenient manner, it being understood that the wetting machine has appropriate structural and bearing members for supporting the drums. Also, convenient drive means are provided for rotating the drums. It is deemed unnecessary to show the details of construction of the various parts just referred to, since these parts are conventional and the particular devices used do not form a part of the present invention. Preferably, the drums 28 are rotated in opposite directions and in the directions that the fingers sweep downwardly on the fowl.

Disposed in the wetting machine 12 are a plurality of pipes 38 extending longitudinally of the machine and positioned above and on either side of the line of travel of the fowl. These pipes 38 may be provided with drilled holes or nozzles as indicated at 40 (Figure 1) which are disposed in a direction for spraying cold water onto the fowl as they pass through the wetting machine. The particular positioning of the pipes 38 and the number and sizes of the nozzles 40 is a matter to be determined by practical considerations in the operation of the device. Leading from the pipes 38 are pipes 42 which in turn are connected with a header 44 which is adapted to be connected with a hydrant or tap supply of water.

The picking machines 14 and 16 each include a pair of picked drums 46 for purposes of picking the feathers from the fowl. These drums 46 may be arranged horizontally as illustrated in Figure 1. The picker drums 46 are similar in construction to the drums 28 having flexible rubber fingers which sweep over the fowl as they pass through the machines; it is understood however, that the drums 46 actually pick the feathers, as distinguished from the drums 28 which merely agitate the feathers. The particular type of picking machines 14 and 16 do not form a part of the present invention. In the usual course of picking fowl, the drums 46 in the picking machine 14 sweep downwardly over the fowl. This action removes the greater part of the feathers from the fowl. In the picking machine 16 the picker drums 46 are rotated so that the fingers sweep upwardly over the fowl. For this purpose, the heads of the fowl are held down by a head holder (not shown) so that the fowl are not swept upwardly by the picker fingers.

The picking machine 18 includes a pair of picker drums 48 arranged lower, with respect to the path of travel of the fowl as compared to the drums in the other machines, and are for the purpose of removing feathers from the wing tips and neck and head. It will be understood, of course, that the particular arrangement of picking machines 14, 16 and 18 and their specific purposes does not form an essential part of the present invention. In each of the machines 14, 16 and 18 are spray pipes 50 arranged similarly to the spray pipes 38 in the wetting machine 12, and similarly provided with holes or nozzles. The spray pipes 50 are each connected to a header 52, for connection with a hydrant or other source of natural temperature cold water. The spray pipes 50 are arranged so that the water sprayed therefrom is directed on to the fowl from various angles during their travel through the machine.

An operator's station is indicated diagrammatically by the reference numeral 54 at the left of the wetting machine 12. This operator's station is the point at which the fowl are killed and suspended on the conveyor 20 for passage through the wetting machine. The location of the operator's station is such that the time elapsed between the killing and the carrying into effect of my method is as desired. After the fowl are killed at the operator's station 54, they are carried by the conveyor into the wetting machine 12, and pass between the agitator drums 28. The agitator drums 28 are rotated preferably at a relatively slow speed, although I do not wish to be limited to a particular rate of speed. The purpose of the drums 28 with the fingers thereon is merely to agitate the feathers on the fowl. Cold water, as it is received from a tap or hydrant, is sprayed on the fowl through the nozzles in the pipes 38. The fingers 34 on the drums 28 thoroughly agitate the feathers on the fowl on all sides thereof, and as the water is sprayed, it thoroughly wets the body of the fowl and all of the feathers thereon. The action of the rotating fingers 34 tends to swing or spin the fowl so that all portions thereof are subjected to the agitating effect of the fingers. Occasional feathers may be removed by the agitator drums, but this is only incidental. If any feathers are thereby removed, the wetting action of the fowl is increased by that fact.

As the fowl pass through the wetting machine 12, they first encounter the higher ends of the drums 28 so that the fingers on the drums act on the upper parts of the fowl and as they continue through the machine, the inclination of the drums causes the drums to act progressively lower on the body of the fowl, and by the time the fowl reach the far end of the drums, the fingers on the latter are acting on the lower parts there, or the heads. It will be remembered that during the entire time that the fowl are passing through the wetting machine 12, the cold water from the nozzles 46 is being sprayed on the fowl.

After the fowl emerge from the wetting machine 12, they go through the picking machines 14, 16 and 18 successively and all of the feathers are removed therefrom. The location of the picking machines 14, 16 and 18 are preferably relatively close together and close to the wetting machine 12, so that the picking action of the picking machines is brought into effect as soon as practicable after the feathers of the fowl are agitated and wetted by the water in the wetting machine 12. After the fowl leave the last picking machine 18, they are carried to other stations for other operations which form no part of the present invention.

I have found that the period of time between killing of the fowl at the station 54 and the commencement of the picking action in the picking machine 14 should be held within a certain period of time for best results. There is, of course, a certain latitude permitted, but I have found that approximately 90 seconds for this period produces excellent results.

The cold water used in the spray pipes 38 as mentioned above, is tap water or hydrant water at natural temperatures. This is contrasted to heated water which has been heated above the temperature which would otherwise prevail due to natural conditions. For example, in the summer time, the temperature of tap or hydrant water may be in the neighborhood of 80° F., while in the winter the temperature of the water from the same source will be much lower. In either case, the temperature of the water is below the normal body temperature of the fowl, and the immediate effect of spraying cold water on the fowl, is to reduce the temperature of said fowl. I have found that excellent results are obtained by using cold water of any temperature below the normal body temperature of the fowl, down to a point only slightly above freezing. The normal body temperature of a healthy chick is in the range of 102° F. to 108° F.

The water sprayed in the spray pipes 50 in the picking machines 14, 16 and 18, is also cold water as received from a tap. At no time in the picking process is heated water used and the chilling effect of the cold water in the wetting machine 12 is continued through the picking machines, and by the time the fowl are carried through all of the apparatus, they are chilled to a considerable extent. This chilling effect has decided advantages for several reasons: One is that the outer skin of the fowl is not heated. Formerly when scalding methods were used, the outer skin of the fowl was subject to injury by the picking fingers. This injury is known as "barking" and results in breaks or ruptures in the skin, and after a period of time, these blemishes appear unsightly and affect the market price of the fowl.

Another decided advantage in using cold water is the saving in fuel which is otherwise required for heating scalding water, and in commercial establishments, this cost runs into substantial amounts. In the present case, the cost of heating the scalding water is totally eliminated. Still another advantage is accomplished in conditioning of fowl preparatory to being subject to the refrigerating or freezing process. By the old methods, when the fowl were scalded, they became heated and subsequently when they are placed in the refrigerator or freezer, it requires substantially continuous operation of the refrigerating apparatus to bring the temperature of the fowl down to a desired temperature. In the present instance, the fowl are chilled so that the refrigerating action is less expensive and more immediately effective.

Another advantage of the present method is the fact that more santitary conditions exist. Previously, and in present practices of old methods, employing the scalding process, the fowl are dipped into a vat of scalding water. The scalding water is, of course, not changed after every fowl, and successive fowls were immersed in the scalding water which resulted in a somewhat unsanitary treatment. If one fowl were contaminated, successive ones would be in danger of being contaminated therefrom. In the present process or method, the wetting agent or water is not reused and after being sprayed onto the fowl, it runs off and into the drain.

It has never been found possible heretofore to wet fowl sufficiently when carried on a conveyor or suspended in air so as to permit performance of an efficient operation of removing feathers. As mentioned above, it is necessary by following old methods, to dip or immerse the fowl in a body of hot water. By the present method, it is possible to properly spray the fowl while suspended in air, to obtain proper wetting of the feathers for expeditious and efficient removal thereof.

The use of cold water in the picking machines 14, 16 and 18 not only continues the chilling effect on the fowl, but causes a lubricating effect for the picking fingers so that there is less tendency of the fingers to injure the outer skin of the fowl.

Although I have herein disclosed a preferred embodiment of my invention, manifestly it is capable of modification without departing from the spirit and scope thereof. I do not, therefore, wish to be understood as limiting my invention to the precise disclosure herein, except as I may be so limited by the appended claims.

I claim as my invention:

1. A method of removing feathers from a fowl having substantially body temperature comprising the steps of forcing the feathers of the fowl out of their normal position with respect to the body of the fowl, whereby the skin of the fowl is exposed, while the feathers are thus held, spraying the fowl with water at a temperature below the body temperature of the fowl and subsequently picking the feathers from the fowl.

2. A method of removing feathers from a fowl having substantially body temperature comprising the steps of forcing the feathers of the fowl out of their normal position with respect to the body of the fowl, whereby the skin of the fowl is exposed, while the feathers are thus held, spraying the fowl with water at a temperature below the body temperature of the fowl and subsequently picking the feathers from the fowl while simultaneously spraying the fowl with water at a temperature below the body temperature of the fowl.

3. A method of removing feathers from a fowl having substantially body temperature in the range of 102° F. to 108° F., comprising the steps of forcing the feathers of the fowl out of their normal position with respect to the body of the fowl, whereby the skin of the fowl is exposed, while the feathers are thus held, spraying the fowl with water at a temperature below the body temperature of the fowl and subsequently picking the feathers from the fowl.

4. A method of removing feathers from a fowl comprising the steps of killing the fowl, then, while the fowl has substantially body temperature, forcing the feathers of the fowl out of their normal position with respect to the body of the fowl, whereby the skin of the fowl is exposed, while the feathers are thus held, spraying the fowl with water at a temperature below the body temperature of the fowl and subsequently picking the feathers from the fowl, the elapsed time between the end of the step of killing the fowl and the beginning of the step of picking the feathers being in the neighborhood of 90 seconds.

5. A method of removing feathers from a fowl comprising the steps of killing the fowl, then, while the fowl has substantially body temperature, forcing the feathers of the fowl out of their normal position with respect to the body of the fowl, whereby the skin of the fowl is exposed, while the feathers are thus held, spraying the fowl with water at a temperature below the body temperature of the fowl and subsequently picking the feathers from the fowl while simultaneously spraying the fowl with water at a temperature below the body temperature of the fowl, the elapsed time between the end of the step of killing the fowl and the beginning of the step of picking the feathers being in the neighborhood of 90 seconds.

SETH S. BARKER.

REFERENCES CITED

The following references are of record in the file of this patent:

UNITED STATES PATENTS

| Number | Name | Date |
|---|---|---|
| 1,760,392 | Arminger | May 27, 1930 |
| 2,214,562 | McCadam et al. | Sept. 10, 1940 |
| 2,328,770 | Barker | Sept. 7, 1943 |
| 2,412,338 | Jasper | Dec. 10, 1946 |